United States Patent
Iyer et al.

(10) Patent No.: US 12,033,412 B2
(45) Date of Patent: Jul. 9, 2024

(54) SYSTEMS AND METHODS FOR EXTRACTING INFORMATION FROM A PHYSICAL DOCUMENT

(71) Applicant: Google LLC, Mountain View, CA (US)

(72) Inventors: Rakesh Iyer, Santa Clara, CA (US); Lisha Ruan, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 528 days.

(21) Appl. No.: 17/291,647

(22) PCT Filed: Jan. 28, 2019

(86) PCT No.: PCT/US2019/015335
§ 371 (c)(1),
(2) Date: May 6, 2021

(87) PCT Pub. No.: WO2020/096635
PCT Pub. Date: May 14, 2020

(65) Prior Publication Data
US 2021/0406451 A1    Dec. 30, 2021

Related U.S. Application Data

(60) Provisional application No. 62/756,262, filed on Nov. 6, 2018.

(51) Int. Cl.
*G06V 30/40* (2022.01)
*G06F 40/169* (2020.01)
*G06V 30/10* (2022.01)

(52) U.S. Cl.
CPC ............ *G06V 30/40* (2022.01); *G06F 40/169* (2020.01); *G06V 30/10* (2022.01)

(58) Field of Classification Search
None
See application file for complete search history.

(56) References Cited

U.S. PATENT DOCUMENTS

| | | | |
|---|---|---|---|
| 5,594,809 A * | 1/1997 | Kopec | G06F 18/295 |
| | | | 382/161 |
| 9,430,141 B1 * | 8/2016 | Lu | G06F 3/04883 |

(Continued)

OTHER PUBLICATIONS

Wang, Xiaochen, et al. "Course concept extraction in MOOC via explicit/implicit representation." 2018 IEEE Third International Conference on Data Science in Cyberspace (DSC). IEEE, 2018. (Year: 2018).*

Ren, Xiang, et al. "Label noise reduction in entity typing by heterogeneous partial-label embedding." Proceedings of the 22nd ACM SIGKDD international conference on Knowledge discovery and data mining. 2016. (Year: 2016).*

(Continued)

*Primary Examiner* — Michelle M Entezari Hausmann
(74) *Attorney, Agent, or Firm* — DORITY & MANNING P.A.

(57) ABSTRACT

Systems and methods for extracting information from documents are provided. In one example embodiment, a computer-implemented method includes obtaining one or more units of text from an image of a document. The method includes determining one or more annotated values from the one or more units of text and determining a set of candidate labels for each annotated value. The method determines each set of candidate labels by performing a search for the candidate labels based at least in part on a language associated with the document and a location of each annotated value. The method includes determining a canonical label for each annotated value based at least in part on the associated candidate labels, and mapping at least one annotated value to an action that is presented to a user based at least in part on the canonical label associated with the annotated value.

19 Claims, 4 Drawing Sheets

(56) References Cited

U.S. PATENT DOCUMENTS

| | | | |
|---|---|---|---|
| 9,606,980 B2* | 3/2017 | Andrejko | G06F 40/56 |
| 9,703,766 B1* | 7/2017 | Kyre | G06F 40/131 |
| 9,911,034 B2* | 3/2018 | Chulinin | G06V 30/246 |
| 10,699,112 B1* | 6/2020 | Corcoran | G06F 16/313 |
| 10,896,357 B1* | 1/2021 | Corcoran | G06F 18/217 |
| 2003/0070139 A1* | 4/2003 | Marshall | G06F 40/169 |
| | | | 715/231 |
| 2004/0261016 A1* | 12/2004 | Glass | H04L 51/212 |
| | | | 715/230 |
| 2012/0294528 A1* | 11/2012 | Li | H04N 1/3873 |
| | | | 382/173 |
| 2015/0100943 A1* | 4/2015 | Gabel | G06F 40/20 |
| | | | 717/106 |
| 2015/0317530 A1* | 11/2015 | Aizawa | G06F 16/9032 |
| | | | 382/182 |
| 2016/0217119 A1 | 7/2016 | Dakin et al. | |
| 2017/0004124 A1* | 1/2017 | Kyre | G06F 40/205 |
| 2018/0032842 A1 | 2/2018 | Yellapragada et al. | |
| 2018/0033147 A1 | 2/2018 | Becker et al. | |
| 2018/0067954 A1* | 3/2018 | Wang | G06F 16/958 |
| 2018/0314884 A1* | 11/2018 | Lee | G06T 7/70 |
| 2018/0373791 A1* | 12/2018 | Yen | G09B 7/04 |
| 2019/0005020 A1* | 1/2019 | Gregory | G06F 18/2411 |
| 2021/0117507 A1* | 4/2021 | Carrier | G06F 40/30 |
| 2024/0005211 A1* | 1/2024 | Wu | G06N 3/045 |

OTHER PUBLICATIONS

Zavesky, Eric, Shih-Fu Chang, and Cheng-Chih Yang. "Visual islands: intuitive browsing of visual search results." Proceedings of the 2008 international conference on Content-based image and video retrieval. 2008. (Year: 2008).*

Sarkhel, Ritesh, and Arnab Nandi. "Visual segmentation for information extraction from heterogeneous visually rich documents." Proceedings of the 2019 international conference on management of data. 2019. (Year: 2019).*

Cheng, Pu-Jen, et al. "Annotating text segments in documents for search." The 2005 IEEE/WIC/ACM International Conference on Web Intelligence (WI'05). IEEE, 2005. (Year: 2005).*

Braylan, Alexander, et al. "A General Model for Aggregating Annotations Across Simple, Complex, and Multi-Object Annotation Tasks." Journal of Artificial Intelligence Research 78 (2023): 901-973. (Year: 2023).*

Rui X, Yu N, Li M, Wu L. On cross-language image annotations. In2009 IEEE International Conference on Multimedia and Expo Jun. 28, 2009 (pp. 1608-1611). IEEE. (Year: 2009).*

International Preliminary Report on Patentability for Application No. PCT/US2019/015335, dated May 20, 2021, 7 pages.

International Search Report for Application No. PCT/US2019/0115335, dated Jul. 25, 2019, 10 pages.

* cited by examiner

SYSTEMS AND METHODS FOR EXTRACTING INFORMATION FROM A PHYSICAL DOCUMENT

PRIORITY CLAIM

The present application claims the benefit of priority under 35 U.S.C. § 371 to International Application No. PCT/US2019/015335 filed on Jan. 28, 2019, which claims the benefit of U.S. Provisional Patent Application No. 62/756,262 filed Nov. 6, 2018, entitled "Systems and Methods for Extracting Information from a Physical Document." Each of the above-referenced patent applications is incorporated herein by reference.

FIELD

The present disclosure relates generally to extracting information from a source. More particularly, the present disclosure relates to automatically extracting useful information from a physical document.

BACKGROUND

A large portion of the world still produces paper documents (e.g., identity cards, bills, receipts, transcripts, etc.) that include useful information (e.g., expiry data, due date, tracking number, etc.). However, it can be difficult to automatically extract useful information from images of these documents because the documents may not adhere to the same static structure, layout, and/or terminology. For example, passport readers are common at airports and are—due to the known and fixed layout and structure of the passport—able to extract various pieces of information from passport documents. Similarly, credit card readers (e.g., image-based readers) may be able to parse out credit card numbers due to the known and fixed layout and structure of the credit card. However, these systems are not robust against changes in structure, layout, and/or terminology of the information sources they are reading and are certainly not able to extract information from an arbitrary document type (e.g., utility bill) that is different than their target document (e.g., passport or credit card).

Furthermore, as another example challenge associated with automatic extraction of information from documents, documents generated by different entities may use inconsistent terminology for the same data item. For example, while two utility bills may both provide a payment due date, a first bill produced by a first utility company may include the information formatted and/or termed in a first way (e.g., "Please pay by:") while a second bill produced by utility company may include the information formatted and/or termed in a second, different way (e.g., "Bill due date:"). The large number of different possible phrasings or terminology presents a significant challenge to automated processing/ understanding of the information extracted from documents.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for extracting information from documents. The method can include obtaining data representing one or more units of text extracted from an image of a document. The method can include determining one or more annotated values from the one or more units of text. The method can include determining a label for each annotated value of the one or more annotated values. The label for each annotated value can include a key that explains the annotated value. The method can include performing, for each annotated value, a search for the label among the one or more units of text based at least in part on a location of the annotated value within the document. The method can include mapping at least one annotated value from the one or more annotated values to an action that is presented to a user based at least in part on the label associated with the at least one annotated value.

Another example aspect of the present disclosure is directed to a computing system. The computing system can include one or more processors, and a computer-readable medium having instructions stored thereon that, when executed by the one or more processors, cause the system to perform operations. The operations can include obtaining data representing one or more units of text extracted from an image of a document. The operations can include determining one or more annotated values from the one or more units of text. The operations can include determining a label for each annotated value of the one or more annotated values. The label for each annotated value can include a key that explains the annotated value. The operations can include performing, for each annotated value, a search for the label among the one or more units of text based at least in part on a location of the annotated value within the document. The operations can include mapping at least one annotated value from the one or more annotated values to an action that is presented to a user based at least in part on the label associated with the at least one annotated value.

Yet another example aspect of the present disclosure is directed to one or more tangible non-transitory computer-readable media storing computer-readable instructions that when executed by one or more processors cause the one or more processors to perform operations. The operations can include obtaining data representing one or more units of text extracted from an image of a document. The operations can include determining one or more annotated values from the one or more units of text. The operations can include determining a label for each annotated value of the one or more annotated values. The label for each annotated value can include a key that explains the annotated value. The operations can include performing, for each annotated value, a search for the label among the one or more units of text based at least in part on a location of the annotated value within the document. The operations can include mapping at least one annotated value from the one or more annotated values to an action that is presented to a user based at least in part on the label associated with the at least one annotated value.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended FIGS., in which.

Figure 1:
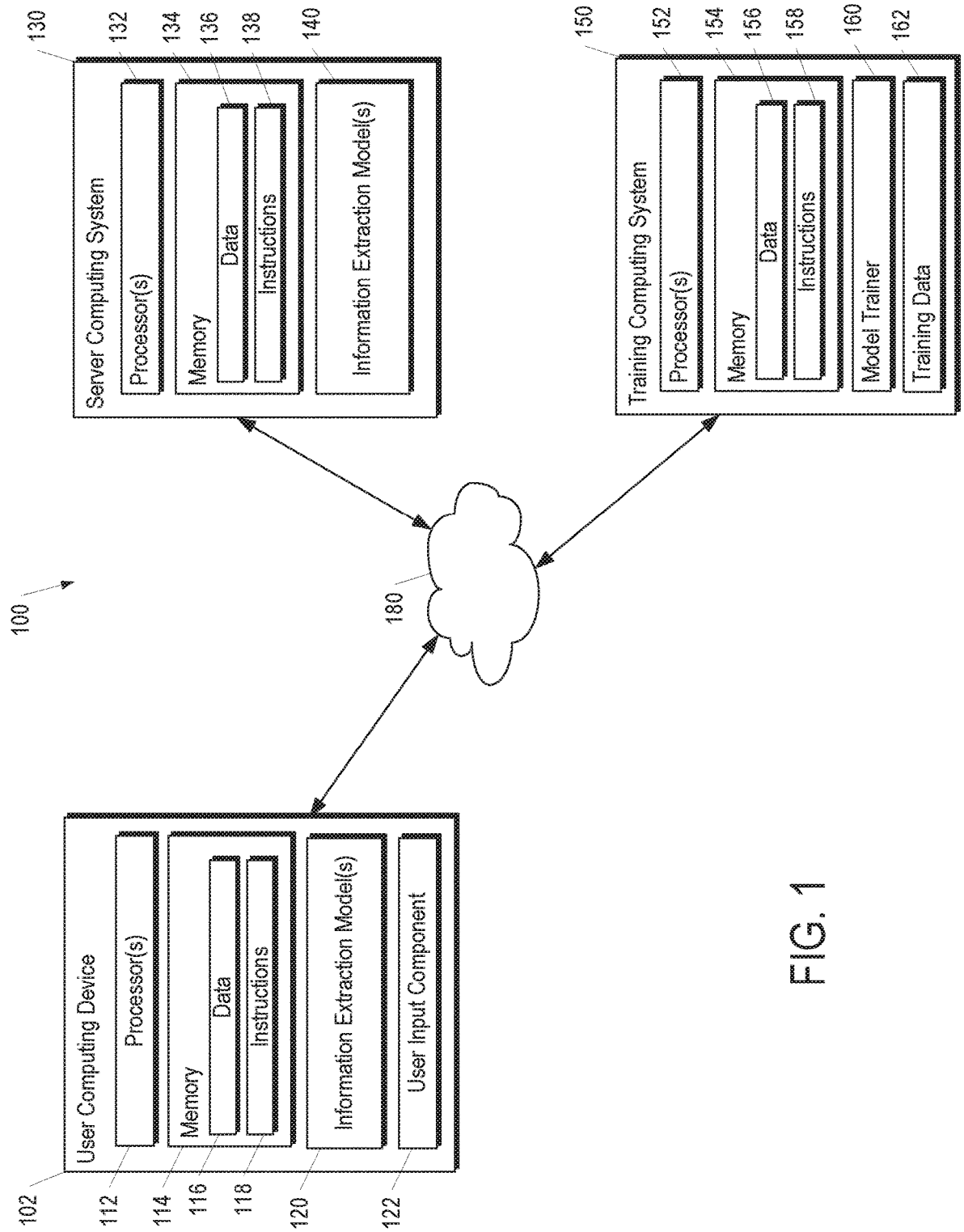
FIG. 1 depicts a block diagram of an example computing system that can extract information from documents, according to example embodiments of the present disclosure.

Reference numerals that are repeated across plural FIGS. are intended to identify the same features in various implementations.

DETAILED DESCRIPTION

Overview

Example aspects of the present disclosure are directed to extracting information from a source, and in particular to automatically extracting useful information from a physical document. Systems and methods consistent with the present disclosure can include one or more information extraction models that can be used to generate data representing the information extracted from a source. The information extraction model(s) can receive image data representing the source, process the image data to recognize text in the source, and annotate the recognized text to detect interesting value(s). For example, an OCR system can recognize text from the image and an annotation system can identify and annotate interesting values in the recognized text. For example, interesting values can include dates, numeric values such as phone numbers, addresses, tracking codes, names, or other values of interest. Furthermore, the systems and methods of the present disclosure can assign a label to each of the annotated values. The label for each annotated value can be a key that explains the annotated value. For example, for a value that is annotated as a date, the label can be a key that explains that the date is a due date for a payment.

In particular, according to an aspect of the present disclosure, the information extraction model(s) can parse the image data as key-value pairs based on a relative position of the annotated value(s) in the source. For example, a candidate label string for an annotated value can be found by looking to the left and top of the annotated value in the coordinate space of the document in the case of a Left-to-Right (LTR) language and looking to the right and top for a Right-to-Left (RTL) language. The candidate label strings can be generated using different heuristics. For example, a label string can be generated by picking up part of the string that is separated by no more than a space. As a specific example, the label string corresponding to a date could be "date of birth" or "payment due," etc.

According to another aspect, the systems and methods of the present disclosure can use semantic matching to determine a canonical label to use in place of the candidate label. As an example, to filter the candidate label strings, the candidate label can be input into an embedding model that uses an embeddings-based similarity scoring system. This embedding model can contain several well-canonical label strings (e.g., "due date", "amount due," "expiration date") that have been converted into respective N-dimensional vectors. The candidate label can also be converted into an N-dimensional embeddings vector and a respective distance can be calculated relative to the canonical label vectors. For example, the well-canonical label that is closest/smallest in distance and above a specified threshold can be selected as the canonical description. Thus, identified values (e.g., dates) can be matched to a well-known canonical label (e.g., "due date") despite the use of varying terminology (e.g., "please pay by").

Thus, the present disclosure provides a number of technical solutions to problems associated with automatic extraction of information from images of documents which may vary in layout, structure, and/or terminology. As one example, the systems and methods of the present disclosure can intelligently search for candidate labels for detected values (e.g., detected dates, names, locations, tracking numbers, etc.) through an understanding that is based on directional language conventions associated with the language of the document of their likely location within the document relative to the value, rather than their absolute location within the document. This can reduce the amount of time and processing power spent searching for candidate labels while also improving accuracy or other outcomes. Second, the present disclosure provides for the use of a machine-learned embeddings model to determine similarity of candidate labels in the document to well-known concepts. The use of an embeddings model can improve the resource usage of the search process because large numbers of different terminology permutations are not required to be stored and searched against. These two solutions, among others, make the proposed systems and methods extremely flexible, removing the need for fixed layouts or QR codes for machine parseability of documents.

According to aspects of the present disclosure, a computing system can obtain content data representing text from an image of a document. In some implementations, the system can include one or more optical character recognition (OCR) models that can receive image data representing the image of the document and output content data representing text recognized from the image of the document. For example, an image of a physical and/or paper document (e.g., bills, ID cards, receipts, tickets, payment cards, package labels, signs, legal documents, etc.) can be generated (e.g., by scanning the physical document, taking a photo of the physical document, etc.). For example, a user can take a photograph of a document using his smartphone. The system can input image data representing the image of the document into the OCR model(s) and obtain the content data that is output by the OCR model(s) in response to the image data.

In some implementations, the system can obtain content data that includes one or more units of text (e.g., words, numbers, phrases, sentences, etc.) from the document. For example, in response to receiving the image data, the OCR model(s) can determine one or more units of text in the document. The OCR model(s) can output content data that includes the one or more units of text.

In some implementations, the system can obtain content data that includes one or more bounding regions associated with the one or more units of text. The one or more bounding regions can each be associated with a unit of text from the one or more units of text. A bounding region that is associated with a unit of text can represent a location (e.g., coordinates) of the unit of text within the document. For example, in response to receiving the image data, the OCR model(s) can determine a coordinate space associated with the document represented by the image data. The OCR model(s) can determine one or more units of text and determine one or more bounding regions associated with the one or more units of text based at least in part on the coordinate space associated with the document. The OCR model(s) can output content data that includes the one or more units of text and the one or more bounding regions.

In some implementations, the system can obtain content data that includes one or more language predictors associated with the one or more units of text. Each language predictor that is associated with a unit of text can represent a prediction of a language associated with the unit of text. As an example, in response to receiving the image of the document, the OCR model(s) can determine one or more units of text from the document and one or more language predictors associated with the one or more units of text. The OCR model(s) can output content data that includes the one or more units of text and the one or more language predictors. As another example, the system can include one or more language prediction models. The system can input the content data into the language prediction model(s) and obtain the one or more language predictors associated with one or more units of text in the content data as an output of the language prediction model(s). In some implementations, the system can determine a language associated with the document, based at least in part on the one or more language predictors (e.g., by assigning a score to each of the one or more language predictors and then determining the language for the document based on the scores). In one example, the language for which the largest number of language predictors have been assigned to units of text can be selected as the language for the document.

According to aspects of the present disclosure, the system can obtain annotated data representing one or more annotated values, based at least in part on content data. In some implementations, the system can include one or more annotation models that can receive content data, and output annotated data. The system can input content data into the annotation model(s) and obtain annotated data that is output by the annotation model(s) in response to the content data. The annotation model(s) can include, for example, one or more regular expression-based systems, grammar parsing based systems, machine-learned models, heuristics, etc.

In some implementations, the annotation model(s) can analyze one or more units of text in the content data to identify and annotate one or more interesting values (e.g., dates, phone numbers, addresses, tracking numbers, knowledge graph entities, etc.) from the one or more units of text. The annotation model(s) can output annotated data that includes the one or more annotated values. The one or more annotated values can each be associated with one or more units of text from the content data. For example, in response to receiving content data that includes a first unit of text (e.g., "555-555-5555"), the annotation model(s) can output annotated data including an annotation value (e.g., "phone number") associated with the first unit of text.

In some implementations, the system can obtain annotated data that includes one or more bounding regions associated with the one or more annotated values. For example, in response to receiving content data that includes a first unit of text and a first bounding region associated with the first unit of text, the annotation model(s) can output annotated data including an annotation value associated with the first unit of text and the first bounding region.

According to aspects of the present disclosure, the system can determine candidate label data representing a set of candidate labels (e.g., one or more candidate labels) for the one or more annotated values in the annotated data. The one or more candidate labels can each be associated with one or more units of text from the content data. In some implementations, a candidate label from the one or more candidate labels can be associated with a string including a plurality of units of text from the content data.

In some implementations, the system can determine candidate label data representing a set of candidate labels for only certain annotated values that match certain types of interest. The types of interest that are relevant and for which candidate labels are determined may differ based on the particular classification for a document. For example, a first set of annotated values may be more relevant (and therefore processed more fully) when extracting information from a utility bill while a second, different set of annotated values may be more relevant (and therefore processed more fully) when extracting information from an event ticket. In some implementations, the classification for the document can be obtained using an ensemble model, an image classifier, and/or a recurrent neural network.

In some implementations, the system can include one or more candidate label models that can receive annotated data, and output candidate label data. The system can input annotated data into the candidate label model(s) and obtain candidate label data that is output by the candidate label model(s) in response to the annotated data.

In some implementations, the candidate label model(s) can determine the one or more candidate labels based at least in part on content data. For example, the document can include information arranged as key-value pairs such that interesting "values" in the document tend to be labeled with corresponding "key" information as to what each value represents. The candidate label model(s) can analyze the content data to determine one or more candidate labels (e.g., one or more units of text) for each annotated value that is indicative of what the annotated value represents.

As an example, the system can determine a language associated with the document (e.g., based on content data including one or more language predictors). If the system determines that the language is a LTR type language, then the system can check a left-side region and/or a top-side region of the document relative to a bounding region associated with an annotated value in the coordinate space of the document in order to determine one or more candidate labels for the annotated value. By contrast, if the system determines that the document language is a RTL type language, then the system can check a right-side region and/or a top-side region relative to a bounding region associated with an annotated value in the coordinate space of the document in order to determine one or more candidate labels for the annotated value. As another example, if an annotated value corresponds to a date, then the one or more candidate labels for the annotated value can include "date of birth," "payment due," etc.

Thus, in one example technique, the search space for the candidate label for an annotated value can be restricted based on the language of the document. For example, if the system determines that the language is a LTR type language, then the system can search only within a search area that primarily encompasses a left-side region and/or a top-side region of the document relative to the bounding region associated with an annotated value in the coordinate space of the document. Likewise, for a RTL type language, the search space can be restricted to a search area that is primarily encompasses a right-side region and/or a top-side region of the document relative to the bounding region associated with an annotated value in the coordinate space of the document.

In another example technique, the search space is not necessarily restricted. However, candidate labels that satisfy certain relative location characteristics can be preferentially selected over those that do not.

For example, for a LTR type language, the system can search for candidate labels in all relative locations around an annotated value. However, the system may be biased toward selecting candidate labels that are located to the left and/or top of the annotated value versus candidate labels that are not so located. In this technique, preference is given to those candidate labels which satisfy certain relative location characteristics, but this preference can be overridden if other characteristics of a given candidate label indicate that it is a better match for the annotated value (e.g., candidate label string includes the word "phone" for a value annotated as "phone number").

In some implementations, the candidate label model(s) can use one or more different techniques (e.g., heuristics) to determine one or more candidate labels for the one or more annotated values. As an example, the candidate label model(s) can use a first technique to determine one or more candidate labels for a first annotated value and use the first technique to determine one or more candidate labels for a second annotated value. As another example, the candidate label model(s) can use a first technique to determine one or more first candidate labels for a first annotated value and use a second technique to determine one or more second candidate labels for the first annotated value. As another example, the candidate label model(s) can use a first technique to determine one or more candidate labels for a first annotated value and use a second technique to determine one or more candidate labels for a second annotated value.

According to aspects of the present disclosure, the system can determine a canonical label for the one or more annotated values in the annotated data, based at least in part on the candidate label data. In some implementations, the system can include one or more scoring models that can receive data representing a set of candidate labels for an annotated value (e.g., one or more candidate labels associated with the annotated value), and output canonical label data representing a canonical label for the annotated value. The system can input candidate label data into the scoring model(s) and obtain canonical label data that is output by the scoring model(s) in response to the candidate label data.

In some implementations, the scoring model(s) can use an embeddings-based similarity scoring technique. The scoring model(s) can include a set of canonical labels (e.g., "due date," "amount due," "expiry date," etc.) that are each converted into an N-dimensional vector. The scoring model(s) can convert each candidate label in the set of candidate labels into an N-dimensional vector and calculate a respective distance between the N-dimensional vectors representing the canonical labels and the candidate labels. The scoring model(s) can select a canonical label based on the distances. For example, the scoring model(s) can determine a canonical label that is closest/smallest in distance to a candidate label, and above a threshold value, as the canonical label for the annotated value associated with the set of candidate labels. The scoring model(s) can output canonical label data that includes the determined canonical label. As examples, the embedding model that produces the embeddings can include a neural network such as, for example, a recurrent neural network and/or a convolutional neural network. In some implementations, the embedding model can be a pre-trained language embedding model (e.g., Word2vec) but the search space for embeddings similarity matching can be constrained to search against only a handful of canonical label embeddings.

Thus, in some implementations, the scoring model(s) can output canonical label data indicative of the calculated distances between the N-dimensional vectors representing the canonical labels and the candidate labels. The system can select a canonical label from a set of canonical labels, based at least in part on the canonical label data such that the distance between the canonical label and the one or more candidate labels is the closest/smallest distance and above a specified threshold.

In some implementations, one of the canonical labels can be selected for an annotated value based on a set of rules that compare the annotations of the annotated value to types of annotations that are associated with the canonical labels. For example, a text string annotated as a date is more likely to be matched with the canonical label of "Due Date" than is it likely to be matched with the canonical label of "Tracking Number." Various other rules or relationships can be annotations and canonical labels can be applied as well.

According to aspects of the present disclosure, the system can map an annotated value to an action based at least in part on a canonical label associated with the annotated value. As an example, if the information extracted from the document includes a payment due date (e.g., an annotated value including a date that is associated with the canonical label "payment due"), then the system can set up a reminder (e.g., an entry in a user's electronic calendar and/or a notification alert) to make an appropriate payment by the due date. As another example, if the information extracted from the document includes a package tracking number (e.g., an annotated value including a number that is associated with the canonical label "tracking number"), then the system can query an API for the status of the package.

The systems and methods described herein may provide a number of technical effects and benefits. For instance, a computing system can include one or more information extraction models. The information extraction model(s) can extract information from data representing a source (e.g., image data representing a scanned document).

The information extraction model(s) can extract information based on images of documents in any position or orientation. Unlike traditional systems that require the document to be aligned in a specific orientation (e.g., passport scanner, credit card scanner, etc.), the information extraction model(s) can extract the information based on a relative position of descriptive labels that are associated with interesting values in the document. In this way, the information extraction model(s) can extract information independent of translation, rotation or perspective distortions, and the information extraction model(s) can identify and compensate for shear and spherical aberrations in the image of a document. In addition, the information extraction model(s) can use language embeddings to determine semantic meaning and similarity which can allow the information extraction model(s) to extract information from a variety of different document types, without needing a long list of strings to match against. In this way, the information extraction model(s) can extract information from documents associated with a plurality of different languages because the embeddings can be independent of language. Thus, the information extraction model(s) of the present disclosure can parse documents which it has potentially never seen before and handle multiple languages with minimal modifications.

The systems and methods described herein may also provide resulting improvements to computing technology tasked automatically extracting information. Improvements in the speed and accuracy of extracting useful information can directly improve operational speed and reduce processing requirements for computing systems, ultimately resulting in more efficient resource use. In this way, valuable computing resources within a computing system that would have otherwise been needed for such tasks can be reserved for other tasks such as extracting information from additional sources.

Example Devices and Systems

FIG. 1 depicts a block diagram of an example computing system 100 that can extract information from documents according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more information extraction models 120. For example, the information extraction models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example information extraction models 120 are discussed with reference to FIGS. 2 and 3.

In some implementations, the one or more information extraction models 120 can be received from the server computing system 130 over network 180, stored in the user computing device memory 114, and then used or otherwise implemented by the one or more processors 112. In some implementations, the user computing device 102 can implement multiple parallel instances of a single information extraction model 120 (e.g., to perform parallel information extraction across multiple instances of image data representing an image of a document).

More particularly, the information extraction models 120 can receive image data representing an image of a document as an input, and in response to receiving the image data, the information extraction models 120 can output a canonical label for each of one or more annotated values in the image data. In particular, the information extraction models 120 can deter mine one or more units of texts in the image data, determine the one or more annotated values based at least in part on the one or more units of text, determine one or more candidate labels for each of the one or more annotated values, and determine a canonical label for each of the one or more annotated labels based at least in part on the one or more candidate labels.

Additionally or alternatively, one or more information extraction models 140 can be included in or otherwise stored and implemented by the server computing system 130 that communicates with the user computing device 102 according to a client-server relationship. For example, the information extraction models 140 can be implemented by the server computing system 140 as a portion of a web service (e.g., an information extraction service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned information extraction models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 and 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the information extraction models 120 and/or 140 based on a set of training data 162. The training data 162 can include, for example, data indicative of optical character recognition performed on image data representing text, data indicative of interesting values from one or more units of text, data indicative of one or more annotations corresponding to one or more units of text, data indicative of a search space for an annotated value that is likely to include information indicative of what the annotated value represents, and/or other data that can be used to train the information extraction models 120 and/or 140.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Model Arrangements

Figure 2:
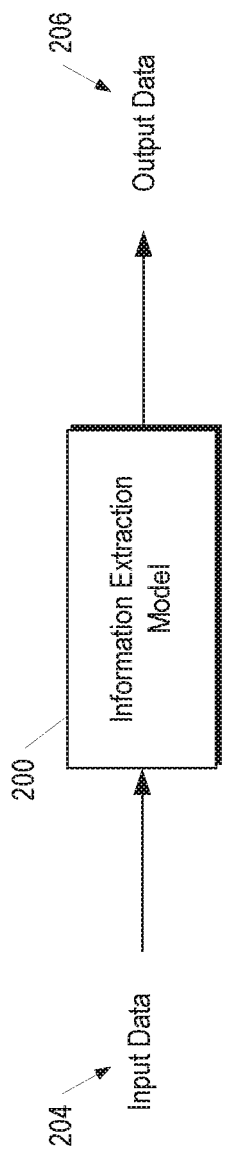
FIG. 2 depicts a block diagram of an example information extraction model, according to example embodiments of the present disclosure.

FIG. 2 depicts a block diagram of an example information extraction model 200 according to example embodiments of the present disclosure. In some implementations, the information extraction model 200 is trained to receive a set of input data 204 descriptive of an image of a document and, as a result of receipt of the input data 204, provide output data 206 that indicates a canonical label for each of one or more annotated values in the input data 204. In particular, the information extraction model 200 can determine one or more units of texts in the input data 204, determine the one or more annotated values based at least in part on the one or more units of text, determine one or more candidate labels for each of the one or more annotated values, and determine a canonical label for each of the one or more annotated labels based at least in part on the one or more candidate labels.

Figure 3:
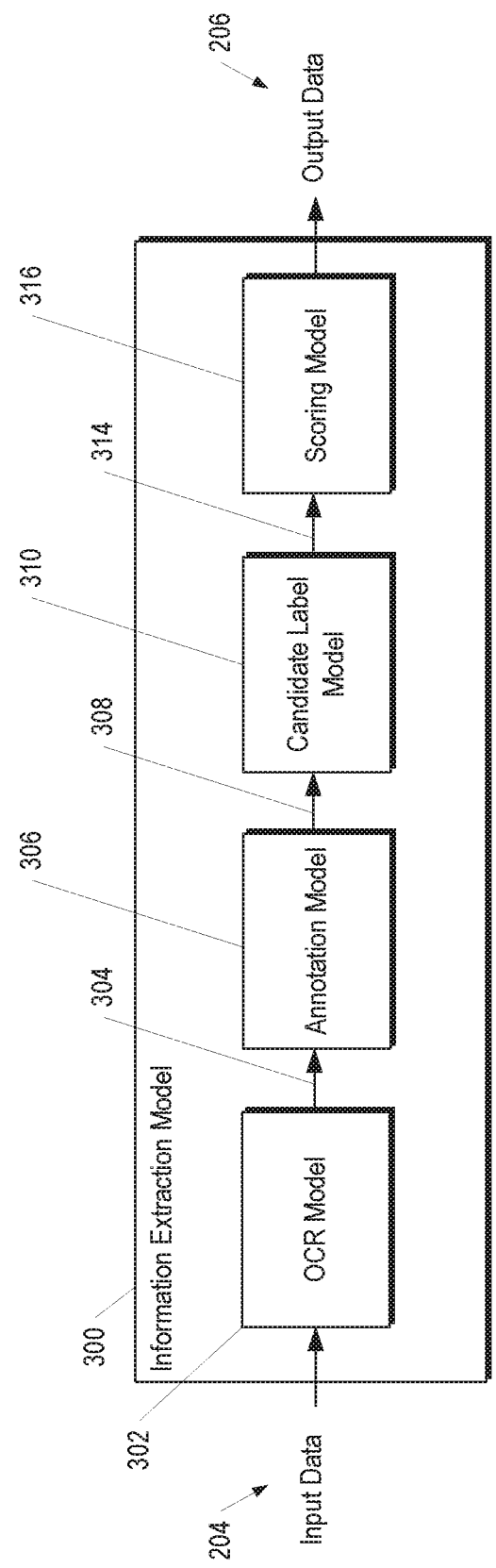
FIG. 3 depicts a block diagram of an example information extraction model, according to example embodiments of the present disclosure.

FIG. 3 depicts a block diagram of an example information extraction model 300 according to example embodiments of the present disclosure. The information extraction model 300 is similar to information extraction model 200 of FIG. 2 except that information extraction model 300 further includes an OCR model 302, annotation model 306, candidate label model 310, and scoring model 316.

The OCR model 302 can be trained to receive the input data 204 descriptive of an image of a document and, as a result of receipt of the input data 204, provide content data 304. The content data 304 can include one or more units of text from the document. In some implementations, the content data 304 can include one or more bounding regions associated with the one or more units of text. The OCR model 302 can determine the one or more units of text and the one or more bounding regions based at least in part on a coordinate space associated with the document. In some implementations, the content data 304 can include one or more language predictors associated with the one or more units of text. In some implementations, the OCR model 302 can include one or more language prediction models trained to receive the content data 304 and, as a result of receipt of the content data 304, provide one or more language predictors associated with the one or more units of texts in the content data 304.

The annotation model 306 can be trained to receive the content data 304 and, as a result of the content data 304, provide annotated data 308. The annotation model 306 can include, for example, a regular expression model, grammar parsing model, heuristics-based model, machine-learned model, and/or other models. The annotated data 308 can include one or more annotated values in the content data 304, the one or more annotated values each being associated with one or more units of text in the content data 304. In some implementations, the annotated data 308 can include one or more bounding regions associated with the one or more annotated values. In particular, the annotation model 306 can analyze the one or more units of text in the content data 304 to identify and annotate one or more interesting values (e.g., dates, phone numbers, addresses, tracking numbers, knowledge graph entities, etc.) from the one or more units of text.

The candidate label model 310 can be trained to receive the annotated data 308 and, as a result of the annotated data 308, provide candidate label data 314. The candidate label data 314 can include, for example, a set of one or more candidate labels for each annotated value in the annotated data 308. Each candidate label in the set of candidate labels associated with an annotated value can be indicative of what the annotated value represents. Each candidate label from the set of candidate labels can be associated with one or more units of text (e.g., a single unit of text or a string including a plurality of units of text) in the content data 304.

In some implementations, the candidate label model 310 can determine a set of candidate labels for only certain annotated values in the annotated data 308 that match certain types of interest. In some implementations, the candidate label model 310 can use one or more different techniques (e.g., heuristics) to determine the one or more sets of candidate labels for the one or more annotated values. In some implementations, the candidate label model 310 can determine a set of candidate labels based at least in part on the content data 304. In particular, the candidate label model 310 can determine information in the document that is arranged as key-value pairs such that interesting "values" in the document tend to be labeled with corresponding "key" information as to what each value represents. In some implementations, the candidate label model 310 can determine a language associated with the document (e.g., based at least in part on content data 304 including one or more language predictors) and determine the set of candidate labels for an annotated value based at least in part on the language of the document. In particular, the candidate label model 310 can determine a search space for the set of candidate labels relative to bounding region associated with the annotated value in the coordinate space associated with the document, based at least in part on the language of the document. The candidate label model 310 can determine the set of candidate labels for the annotated value based at least in part on one or more units of text in the content data 304 that are within the search space.

The scoring model 316 can be trained to receive the candidate label data 314 and, as a result of the candidate label data 314, provide output data 206. The output data 206 can include a canonical label (e.g., canonical label data) for each of the one or more annotated values in the annotated data 308. In some implementations, the scoring model 316 can use an embeddings-based similarity scoring technique. In particular, the scoring model 316 can include a set of canonical labels (e.g., "due date," "amount due," "expiry date," etc.) that are each converted into an N-dimensional vector. The scoring model 316 can convert each candidate label in the candidate label data 314 into an N-dimensional vector and calculate a respective distance between the N-dimensional vectors representing the canonical labels and the candidate labels. The scoring model 316 can determine a canonical label for an annotated value such that the N-dimensional vector of the canonical label is closest/smallest in distance (and above a specified threshold) to the N-dimensional vectors of the candidate labels in the set of candidate labels associated with the annotated value.

Figure 4:
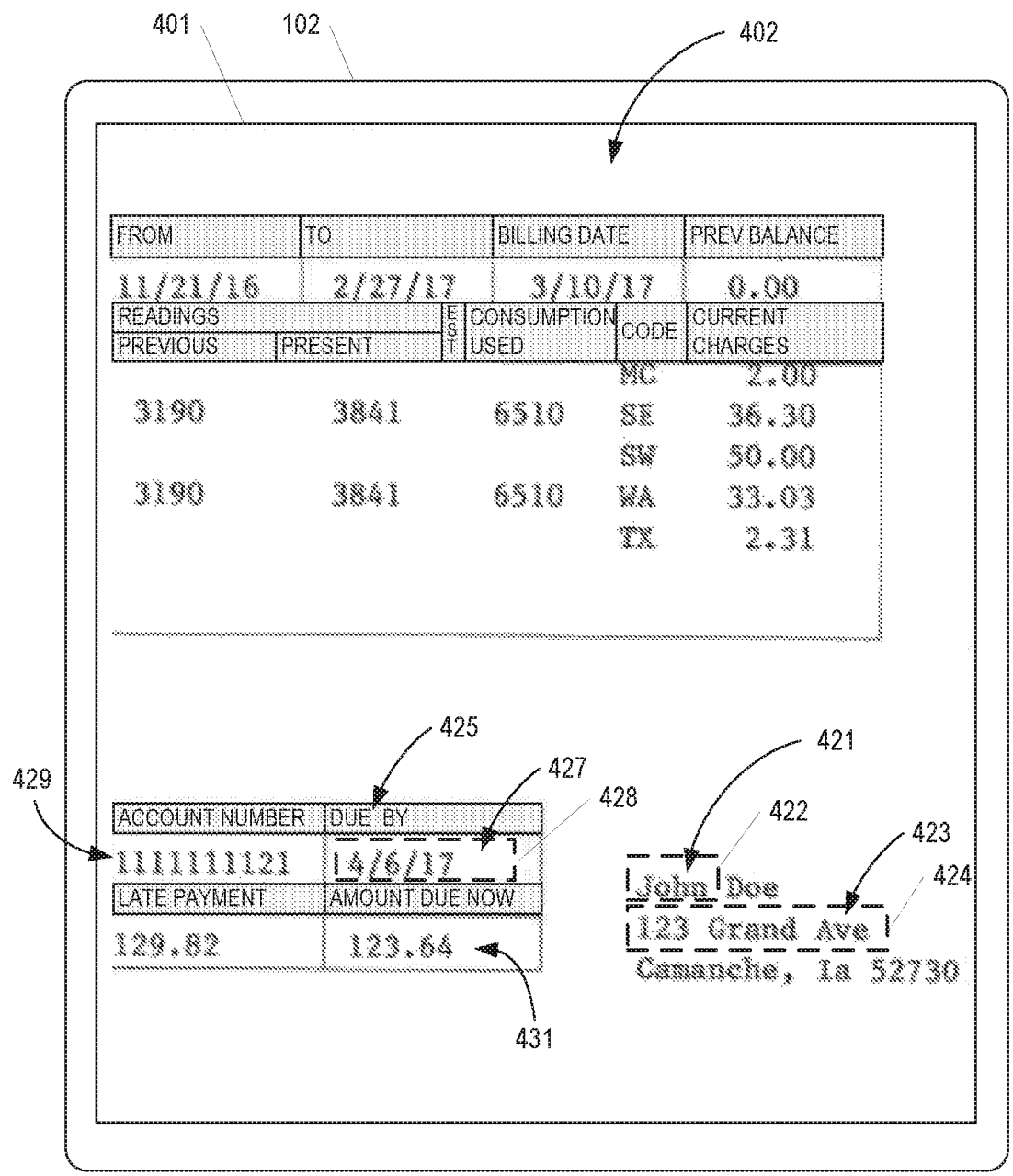
FIG. 4 depicts a diagram of example image data representing a document, according to example embodiments of the present disclosure.

FIG. 4 depicts a diagram of example image data representing a document according to example embodiments of the present disclosure. The user computing device 102 can generate image data 402 (e.g., by scanning the physical document, taking a photo of the physical document, etc.). In some implementations, the user computing device 102 can display the image data 402 via a display device 401 of the user computing device 102. The user computing device 102 can input the image data 402 into the information extraction model(s) 120 (e.g., information extraction model 300) and, in response to the image data 402, obtain data representing a canonical label for each of one or more annotated values associated with the image data 402.

The user computing device 102 can input the image data 402 as part of input data 204 into the OCR model 302 and, in response to the input data 204, obtain the content data 304 representing text recognized from the image data 402. The content data 304 can include one or more units of text from the image data 402. As shown in FIG. 4, for example, the content data 304 can include a unit of text 421 ("John"), unit of text 423 ("123 Grand Ave"), unit of texts 425 ("DUE BY"), unit of text 427 ("4/6/17"), unit of text 429 ("1111111121"), and unit of text 431 ("123.64"). In some implementations, the content data 304 can include one or more bounding regions associated with the one or more units of text. As shown in FIG. 4, for example, the content data 304 can include a bounding region 422 associated with the unit of text 421, bounding region 424 associated with the unit of text 423, and bounding region 428 associated with the unit of text 427. In some implementations, the user computing device 102 can input the content data 304 into one or more language predictor models and, in response to the content data 304, obtain data representing one or more language predictors associated with the one or more units of text in the content data 304. For example, the user computing device 103 can input the units of text 421, 423, and 425 into the language predictor model(s) and obtain a language predictor associated with each unit of text 421, 423, and 425 indicative of a LTR language (e.g., English).

The user computing device 102 can input the content data 304 into the annotation model 306 and, in response to the content data 304, obtain the annotated data 308 representing one or more annotated values in the content data 304. The one or more annotated values in the annotation data 308 can each be associated with one or more units of text in the content data 304. For example, the user computing device 102 can input data representing the units of text 421, 423, 425, 427, 429, and 431 into the annotation model 306 and obtain annotated data 308 that can include a first annotated value associated with the unit of text 421, a second annotated value associated with the unit of text 423, and a third annotated value associated with the unit of text 427. The first annotated value can correspond to "name," the second annotated value can correspond to "address," and the third annotated value can correspond to "date."

The user computing device 102 can input the annotated data 308 into the candidate label model 310 and, in response to the annotated data 308, obtain candidate label data 314 representing a set of one or more candidate labels for each annotated value in the annotated data 308. For example, the user computing device 102 can input data representing the third annotated value into the candidate label model 310 and obtain a set of candidate labels associated with the third annotated value. The candidate label model 310 can determine a search space for the set of candidate labels relative to a bounding region associated with the third annotated value (e.g., the bounding region 428 associated with the unit of text 427 that is associated with the third annotated value), and determine the set of candidate labels based at least in part on one or more units of text in the content data 304 that are within the search space. In particular, the candidate label model 310 can determine the search space that is located to the left and/or top of the third annotated value (e.g., located to the left and/or top of the bounding region 428) based at least in part on the language predictor associated with the unit of text 427 indicative of a LTR language (e.g., English). As shown in FIG. 4, for example, the set of candidate labels associated with the third annotated value can include a first candidate label associated with the unit of text 429 to the left of the bounding region 428, and a second candidate label associated with the unit of text 425 to the top of the bounding region 428.

The user computing device 102 can input the candidate label data 314 into the scoring model 316 and, in response to the candidate label data 314, obtain output data 206 representing a canonical label for each of the one or more annotated values in the annotated data 308. For example, the user computing device 102 can input data representing the first and second candidate label for the third annotated value and obtain a canonical label for the third annotated value. In particular, the scoring model 316 can include a set of canonical labels (e.g., "due date," "amount due," "expiry date," etc.) that are each converted into an N-dimensional vector. The scoring model 316 can convert the first candidate label and the second candidate label in the candidate label data 314 into N-dimensional vectors and calculate a respective distance between the N-dimensional vectors representing the canonical labels and the candidate labels. The scoring model 316 can determine a canonical label (e.g., "due date") for the third annotated value such that the N-dimensional vector of the canonical label is closest/smallest in distance (and above a specified threshold) to the N-dimensional vectors of the candidate labels in the set of candidate labels associated with the third annotated value.

In some implementations, the user computing device 102 can select one of the canonical labels for an annotated unit of text based on a set of rules that compare the annotations to types of annotations that are associated with the canonical labels. For example, the unit of text 427 which has been annotated as a date can be matched with the canonical label of "due date" rather than, for example, an alternative canonical label of "amount due" since the "amount due" label should instead be matched with units of text that have been annotated as numbers. Various other rules or relationships between annotations and canonical labels can be applied as well.

The user computing device 102 can map the third annotated value to an action based at least in part on the canonical label associated with the third annotated value. For example, the user computing device 102 can set up a reminder to make an appropriate payment by the date indicated by the unit of text 427 associated with the third annotated value and the canonical label "due date."

In some implementations, the user computing device 102 can provide the image data 402 to the server computing system 130, and/or the server computing system 130 can obtain the image data 402 from one or more other computing systems and/or devices. The server computing system 130 can input the image data 402 into the information extraction model(s) 140 (e.g., information extraction model 300) and, in response to the image data 402, obtain data representing a canonical label for each of one or more annotated values associated with the image data 402.

Example Methods

Figure 5:
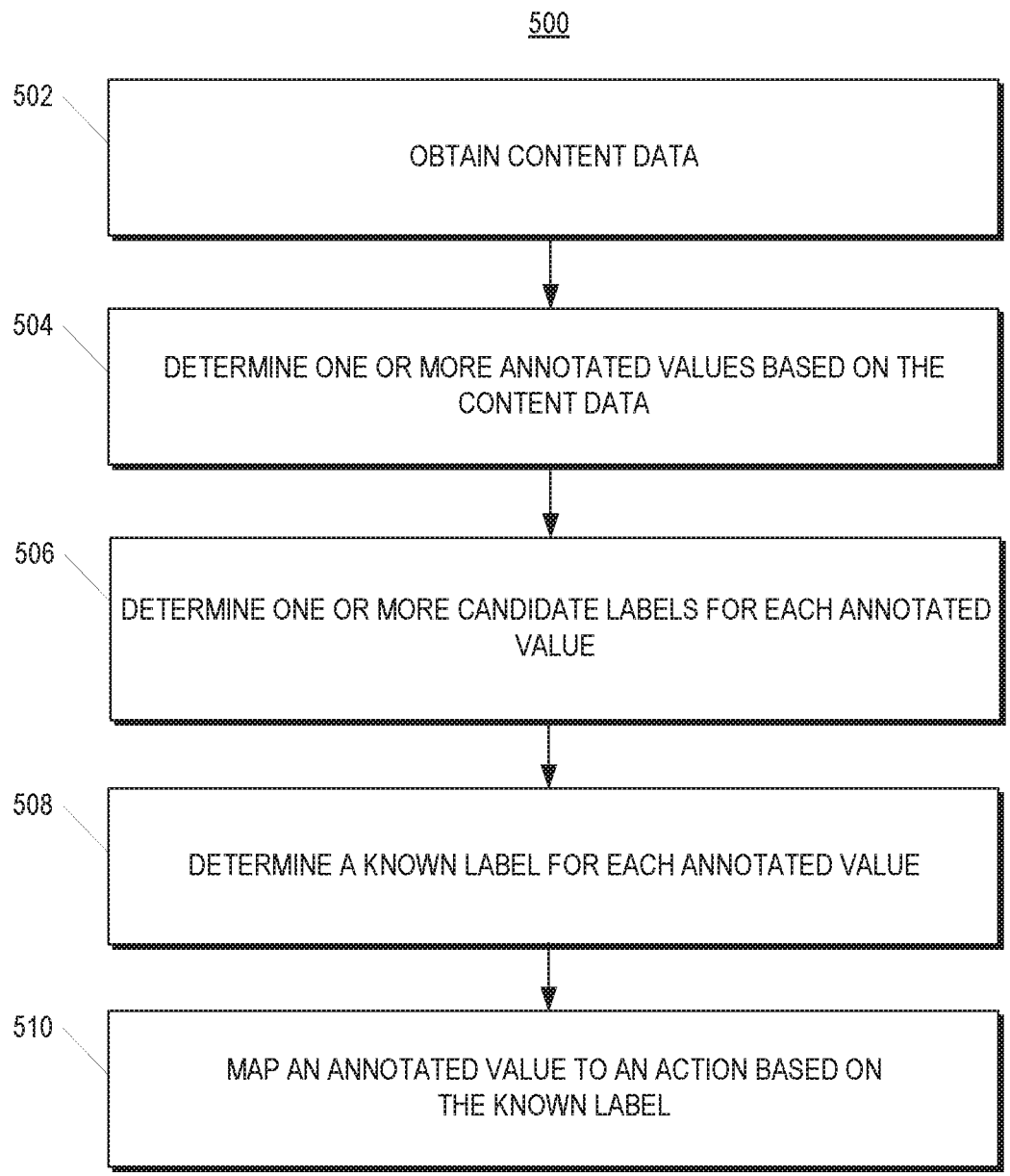
FIG. 5 depicts a flow chart diagram of an example method to extract information from documents, according to example embodiments of the present disclosure.

FIG. 5 depicts a flow chart diagram of an example method to extract information from documents according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain content data. For example, the user computing device 102 can obtain input data 204 (e.g., image data) and input the input data 204 into the OCR model 302. The user computing device 102 can obtain content data 304 as an output of the OCR model 302 in response to the input data 204. The input data 204 can represent an image of a document, and the content data 304 can represent one or more units of text from the image of the document.

In some implementations, the OCR model 302 can determine one or more bounding regions associated with the one or more units of text, and the content data 304 can include data indicative of the one or more bounding regions. Each bounding region that is associated with a unit of text can represent a position of the unit of text within a coordinate space associated with the document.

In some implementations, the OCR model 302 can determine one or more language predictors associated with the one or more units of text, and the content data 304 can include data indicative of the one or more language predictors and/or data indicative of a language associated with the document.

Some example systems and methods which are able to identify, in response to a query, images of documents from which to extract information according to method 500 are described in U.S. patent application Ser. No. 16/114,788 filed Aug. 28, 2018 and titled "Image Query Analysis." U.S. patent application Ser. No. 16/114,788 is incorporated by reference herein in its entirety.

Referring still to FIG. 5, at 504, the computing system can determine one or more annotated values based on the content data. For example, the user computing device 102 can input the content data 304 into the annotation model 306. The user computing device 102 can obtain annotated data 308 as an output of the annotation model 306 in response to the content data 304. The annotation model 306 can include, for example, a regular expression-based model, grammar parsing based model, machine-learned model, or heuristics model. The annotated data 308 can include one or more annotated values from the one or more units of text in the content data 304. In some implementations, each of the one or more annotated values is associated with one or more units of text and the bounding region that is associated with the one or more units of text. The one or more annotated values can include, for example, a date, numeric value, phone number, or address.

At 506, the computing system can determine one or more candidate labels for each annotated value. For example, the user computing device 102 can input the annotated data 308 into the candidate label model 310. The user computing device 102 can obtain candidate label data 314 as an output of the candidate label model 310 in response to the annotated data 308. The candidate label data 314 can include a set of one or more candidate labels for at least one annotated value in the annotated data 308. The candidate label model 310 can determine each set of candidate labels by performing a search for the set of candidate labels based at least in part on a language associated with the document and a location of each annotated value in the coordinate space associated with the document.

In some implementations, the candidate label model 310 can perform the search for a set of candidate labels by defining a search space relative to the location of the associated annotated value within the coordinate space associated with the document, based at least in part on a directional language convention associated with the language of the document. The candidate label model 310 can search for the set of candidate labels only within the defined search space.

In some implementations, the candidate label model 310 can determine each set of candidate labels based at least in part on one or more key-value pairs represented by the content data 304 (e.g., data representing text from the image of the document). The candidate label model 310 can determine that a key in the document that is located proximate to a location associated with an annotated value forms a key-value pair with the annotated value.

In some implementations, the candidate label model 310 can determine at least a first candidate label for an annotated value in the annotated data 308 based at least in part on a first technique and determine at least a second candidate label for an annotated value in the annotated data 308 based at least in part on a second technique. In some implementations, the first candidate label and the second candidate label can be associated with the same annotated value (e.g., the first and second candidate labels can be part of a set of candidate labels associated with the same annotated value).

In some implementations, the candidate label model 310 can determine each set of candidate labels by searching only a left-side region and a top-side region relative to a location associated with an annotated value (e.g., a bounding region associated with the annotated value) in the coordinate space of the document when a language associated with the document is a LTR language. Alternatively, the candidate label model 310 can determine each set of candidate labels by searching only a right-side region and a top-side region relative to a location associated with the annotated value (e.g., a bounding region associated with the annotated value) in the coordinate space of the document when the language associated with the document is a RTL language.

At 508, the computing system can determine a canonical label for each annotated value. For example, the user computing device 102 can input the candidate label data 314 into the scoring model 316. The user computing device 102 can obtain output data 206 as an output of the scoring model 316 in response to the candidate label data 314. The output data 206 can include a canonical label for each annotated value from the one or more annotated values in the annotated data 308. The scoring model 316 can determine a canonical label for each annotated value based at least in part on the set of candidate labels associated with the annotated value.

In some implementations, the scoring model 316 can determine the canonical label for each annotated value by producing an embedding for each of the one or more candidate labels determined for such annotated value, determining a respective distance between the embedding for each of the one or more candidate labels and respective embeddings associated with a plurality of canonical labels, and selecting the canonical label for the annotated value from the plurality of canonical labels based at least in part on the respective distances between the embedding for each of the one or more candidate labels and respective embeddings associated with a plurality of canonical labels.

In some implementations, the scoring model 316 can select the canonical label for the annotated value from the plurality of canonical labels by selecting the canonical label from the plurality of canonical labels such that the distance between the respective embeddings of the canonical label and the one or more candidate labels is the closest/smallest distance and above a specified threshold. In some implementations, the plurality of canonical labels can include, for example, a due date, amount due, or expiry date. In some implementations, the canonical label can be associated with a standard or canonical description.

At 510, the computing system can map an annotated value to an action based on the canonical label. For example, the user computing device 102 can map at least one annotated value from the one or more annotated values in the annotated data 308 to an action that is presented to a user based at least in part on the canonical label associated with the at least one annotated value.

If the information extracted from the document includes a payment due date (e.g., an annotated value including a date that is associated with the canonical label "payment due"), then the user computing device 102 can set up a reminder (e.g., an entry in a user's electronic calendar and/or a notification alert) to make an appropriate payment by the due date. If the information extracted from the document includes a package tracking number (e.g., an annotated value including a number that is associated with the canonical label "tracking number"), then the user computing device 102 can query an API for the status of the package.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for extracting information from documents, the method comprising:
   obtaining, at a computing system comprising one or more processors, data representing one or more units of text extracted from an image of a document;
   determining, by the computing system, one or more annotated values from the one or more units of text;
   determining, by the computing system, a label for each annotated value of the one or more annotated values, wherein the label for each annotated value comprises a key that explains the annotated value, and wherein determining, by the computing system, the label for each annotated value comprises performing, by the computing system for each annotated value, a search for the label among the one or more units of text based at least in part on a location of the annotated value within the document;
   wherein determining, by the computing system, the label for each annotated value comprises:
      determining, by the computing system based on the search, a set of one or more candidate labels for each annotated value, wherein preference is given to candidate labels that satisfy relative location characteristics, wherein the relative location characteristics comprise:
inclusion in left-side region or a top-side region relative to the location associated with the annotated value in a coordinate space of the document when a language associated with the document is a Left-to-Right (LTR) language, or
inclusion in a right-side region or the top-side region relative to the location associated with the annotated value in the coordinate space of the document when the language associated with the document is a Right-to-Left (RTL) language; and
determining, by the computing system, a canonical label for each annotated value based at least in part on the set of one or more candidate labels associated with the annotated value; and
mapping, by the computing system, at least one annotated value from the one or more annotated values to an action that is presented to a user based at least in part on the label associated with the at least one annotated value.

2. The computer-implemented method of claim 1, wherein determining the canonical label for each annotated value comprises
producing, by the computing system, an embedding for each of the one or more candidate labels determined for such annotated value;
determining, by the computing system, a respective distance between the embedding for each of the one or more candidate labels and respective embeddings associated with a plurality of canonical labels; and
selecting, by the computing system, the canonical label for the annotated value from the plurality of canonical labels based at least in part on the respective distances between the embedding for each of the one or more candidate labels and respective embeddings associated with a plurality of canonical labels.

3. The computer-implemented method of claim 2, wherein selecting, by the computing system, the canonical label for the annotated value from the plurality of canonical labels based at least in part on the respective distances comprises selecting, by the computing system, the canonical label from the plurality of canonical labels such that the distance between the respective embeddings of the canonical label and the one or more candidate labels is the smallest distance and above a specified threshold.

4. The computer-implemented method of claim 2, wherein the plurality of canonical labels comprise one or more of: due date, amount due, or expiry date.

5. The computer-implemented method of claim 1, wherein determining, by the computing system based on the search, the set of one or more candidate labels for each annotated value, where preference is given to candidate labels that satisfy relative location characteristics, comprises:
defining, by the computing system, a search space relative to the location of the annotated value within a coordinate space associated with the document, the search space defined based at least in part on a directional language convention associated with the language of the document; and
searching, by the computing system, for the label only within the defined search space.

6. The computer-implemented method of claim 1, wherein obtaining the data representing the one or more units of text extracted from an image of a document comprises:
obtaining, by the computing system, image data representing the image of the document;
inputting, by the computing system, the image data into an optical character recognition (OCR) model; and
obtaining, by the computing system, an output of the OCR model in response to the image data, the output including the one or more units of text.

7. The computer-implemented method of claim 1, wherein the data representing the one or more units of text comprises one or more bounding regions associated with the one or more units of text, each bounding region representing a position of the unit of text within a coordinate space associated with the document.

8. The computer-implemented method of claim 7, wherein each annotated value is associated with at least one of the one or more units of text and the bounding region that is associated with the at least one unit of text.

9. The computer-implemented method of claim 1, wherein the data representing the one or more units of text comprises one or more language predictors associated with the one or more units of text.

10. The computer-implemented method of claim 1, wherein determining the one or more annotated values comprises:
inputting, by the computing system, the one or more units of text into an annotation model; and
obtaining, by the computing system, an output of the annotation model in response to the one or more units of text, the output including the one or more annotated values.

11. The computer-implemented method of claim 10, wherein the annotation model includes one or more of a regular expression-based model, grammar parsing based model, machine-learned model, or heuristics model.

12. The computer-implemented method of claim 1, wherein the one or more annotated values include one or more of: a date, a numeric value, a phone number, or an address.

13. The computer-implemented method of claim 1, wherein determining the label for each annotated value comprises:
inputting, by the computing system, the one or more annotated values into a candidate label model; and
obtaining an output of the candidate label model in response to the one or more annotated values, by the computing system, the output including a set of one or more candidate labels for at least one annotated value from the one or more annotated values.

14. The computer-implemented method of claim 13, wherein the candidate label model determines each set of one or more candidate labels based on one or more key-value pairs represented by the data representing the one or more units of text extracted from the image of the document.

15. The computer-implemented method of claim 1, wherein the set of candidate labels for each annotated value includes at least a first candidate label based on a first technique and at least a second candidate label based on a second technique.

16. The computer-implemented method of claim 1, wherein determining, by the computing system based on the search, the set of one or more candidate labels for each annotated value, where preference is given to candidate labels that satisfy relative location characteristics, comprises:

searching only the left-side region and the top-side region relative to the location associated with the annotated value in the coordinate space of the document when the language associated with the document is the LTR language, or searching only the right-side region and the top-side region relative to the location associated with the annotated value in the coordinate space of the document when the language associated with the document is the RTL language.

17. The computer-implemented method of claim 1, wherein each annotated value includes or is based on a first subset of the one or more units of text and wherein the label for each annotated value includes or is based on a second subset of the one or more units of text that is different from and non-overlapping with the first subset of the one or more units of text.

18. A computing system, the systems comprising:
    one or more processors; and
    a computer-readable medium having instructions stored thereon that, when executed by the one or more processors, cause the system to perform the computer-implemented method of claim 1.

19. A non-transitory computer-readable medium having instructions stored thereon that, when executed by the one or more processors, cause one or more processors to perform the computer-implemented method of claim 1.

\* \* \* \* \*